United States Patent
Petignaud et al.

(10) Patent No.: US 11,454,829 B2
(45) Date of Patent: Sep. 27, 2022

(54) METHOD AND DEVICE FOR MEASURING DATA FOR FITTING AN OPHTHALMIC LENS IN A FRAME FOR A GIVEN INDIVIDUAL

(71) Applicant: ESSILOR INTERNATIONAL, Charenton-le-Pont (FR)

(72) Inventors: Cécile Petignaud, Charenton-le-Pont (FR); Amandine Debieuvre, Charenton-le-Pont (FR); Bénédicte Deldalle, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 324 days.

(21) Appl. No.: 16/619,877

(22) PCT Filed: Jun. 5, 2018

(86) PCT No.: PCT/EP2018/064804
§ 371 (c)(1),
(2) Date: Dec. 5, 2019

(87) PCT Pub. No.: WO2018/224515
PCT Pub. Date: Dec. 13, 2018

(65) Prior Publication Data
US 2021/0149225 A1   May 20, 2021

(30) Foreign Application Priority Data
Jun. 9, 2017 (EP) ..................................... 17305702

(51) Int. Cl.
*G02C 13/00* (2006.01)

(52) U.S. Cl.
CPC .................. *G02C 13/005* (2013.01)

(58) Field of Classification Search
CPC .... G02C 13/005; G02C 13/00; G02C 13/003; G02C 7/0025; G02C 7/027; G02C 7/101; G02C 7/06
(Continued)

(56) References Cited

U.S. PATENT DOCUMENTS

| 4,160,330 A | 7/1979 | Grolman |
| 4,167,067 A | 9/1979 | Guiset |

(Continued)

OTHER PUBLICATIONS

International Search Report, dated Aug. 1, 2018, from corresponding PCT application No. PCT/EP2018/064804.
(Continued)

*Primary Examiner* — Stephone B Allen
*Assistant Examiner* — Rahman Abdur
(74) *Attorney, Agent, or Firm* — Nixon & Vanderhye (57) ABSTRACT

Disclosed is a method for measuring data for fitting an ophthalmic lens in a frame for a individual, including the following steps: a) placing the individual in a natural posture; b) displaying a visual target with adjustable position in the field of view of the individual; c) having the individual equipped with the frame adjust the position of the visual target in order to place it straight ahead from him; d) determining the intersection, with a surface representative of the lens once placed in the frame, of the line of sight of the individual looking at the visual target with its adjusted position and determining the data based on the intersection determined.

16 Claims, 3 Drawing Sheets

(58) Field of Classification Search
USPC .......................................... 359/204; 351/204
See application file for complete search history.

(56) References Cited

U.S. PATENT DOCUMENTS

| | | | | |
|---|---|---|---|---|
| 6,097,590 | A * | 8/2000 | Genevieve | G02C 13/005 361/679.21 |
| 2011/0007269 | A1 * | 1/2011 | Trumm | G02C 13/005 351/204 |
| 2011/0292345 | A1 | 12/2011 | Haddadi | |
| 2012/0033178 | A1 * | 2/2012 | Chauveau | A61B 3/11 351/204 |
| 2012/0182521 | A1 | 7/2012 | Kubitza et al. | |
| 2013/0321763 | A1 | 12/2013 | Haddadi et al. | |

OTHER PUBLICATIONS

Written Opinion, dated Aug. 1, 2018, from corresponding PCT application No. PCT/EP2018/064804.
Essilor; Visioffice 2 system measuring protocol; Retrieved from the internet: https://essilorusa.com/content/dam/essilor-redesign/visioffice/LDMD000020_Visioffice%202_Protocol%20Manual_LR.pdf; Apr. 6, 2015; pp. 3-11.

* cited by examiner

METHOD AND DEVICE FOR MEASURING DATA FOR FITTING AN OPHTHALMIC LENS IN A FRAME FOR A GIVEN INDIVIDUAL

TECHNICAL FIELD OF THE INVENTION

The invention relates to a method for measuring data for fitting an ophthalmic lens in a frame for an individual.

It also relates to a device for measuring data for fitting an ophthalmic lens in a frame for a given individual by implementing this method.

BACKGROUND INFORMATION AND PRIOR ART

Manufacturing an ophthalmic lens adapted to an individual and a frame in order to provide the individual with appropriate ophthalmic equipment requires the determination of fitting parameters of the lens in the chosen frame.

These fitting parameters comprise, among others, the fitting height, the interpupillary distance and the right and left monocular pupillary distances of the individual. The position of the fitting point of the lens relative to the frame is also an important fitting parameter for equipment with lenses, in particular with progressive lenses. It is necessary to ensure that this fitting point of the lens, when placed inside the frame, and when the frame is placed on the head of the individual, will be in front of the pupil of the individual when he is in his natural posture.

The pantoscopic angle of the frame relative to the head of the wearer may also be taken into account in order to fit the lens into the frame, for example, in the determination of the position of the fitting point.

In order to be accurate, the measurement of the fitting parameters such as the fitting height requires the individual to be in his natural posture. The natural posture is assumed by the individual when he looks straight ahead to the horizon without any visual or postural constraint. This natural posture is also called orthostatic posture and corresponds to the position in which the individual achieves minimal efforts.

In this natural posture, the Frankfurt plane of the head is horizontal. The Frankfurt plane is defined as the plane passing through the inferior margin of an orbit (for example, the point called the left orbital) and the upper margin of each ear canal or external auditory meatus, a point called the porion.

Unfortunately, the individual may not always assume this natural posture and the visual behavior of the individual is often disrupted at the moment of the measurement. The accuracy of the measurements achieved is therefore unsatisfactory in many cases, leading to the manufacturing of an ophthalmic equipment that is not completely adapted to the individual.

SUMMARY OF THE INVENTION

Therefore one object of the invention is to provide a new method for measuring data for fitting an ophthalmic lens in a frame for a given individual ensuring that the individual remains in his natural posture while the measurements necessary for determining fitting data are achieved.

To this end, the invention proposes a method for measuring data for fitting an ophthalmic lens in a frame for a given individual, comprising the following steps:

a) placing said individual in a natural posture assumed by the individual when he looks straight ahead to the horizon without any visual or postural constraint, b) displaying a visual target with adjustable position in the field of view of the individual, c) having the individual equipped with the frame adjust the position of the visual target in order to place it straight ahead from him, d) determining the intersection, with a surface representative of the lens once placed in the frame, of the line of sight of the individual looking at the visual target with its adjusted position and determining said data for fitting an ophthalmic lens in a frame based on the intersection determined.

Thanks to the present invention, the individual is provided with the visual task of adjusting the position of the visual target so that he remains in a posture close to his natural posture. This enhances the stability of the posture of the individual during the achievement of the fitting measurements.

The individual preferably wears a frame at least during steps c) and d).

It is therefore possible either to capture an image of the individual looking at the visual target in its adjusted position and deduce the fitting parameters from this image, or manually mark the position of the intersection of the line of sight of the individual and the lens. The position of the fitting cross and/or the fitting height of the lens in the chosen frame can then be determined.

The method according to the invention therefore allows a more accurate determination of the fitting parameters of the lens inside the frame chosen by the individual. This is expected to improve the adaptation of the individual to his new equipment and lower the rate of equipment returned by the individual because of an adaptation issue.

Other advantageous and non-limiting features of the method according to the invention include:

- in step a), the individual is placed in a natural posture while standing and/or seating and/or walking and/or achieving a given task;
- in step a), at least a parameter representative of the natural posture of the individual is determined, said parameter representative of the natural posture comprising one or several angles of rotation of the head of the individual measured, or being deduced from the angles of rotation of the head in natural posture determined in different situations;
- in step a), a parameter representative of the posture of the individual is measured while standing and/or seating and/or walking while looking straight ahead without constraint and the parameter representative of the natural posture is determined based on this measurement;
- in step c) and/or d), the parameter representative of the posture of the individual looking at the visual target is determined and compared to the corresponding parameter representative of the natural posture determined in step a);
- in a further step e), when the comparison of the parameter representative of the posture of the individual determined in step c) and/or d) to the parameter representative of the natural posture determined in step a) show a difference higher than a first predetermined threshold, the posture of the individual is corrected in order to reduce this difference and step c) and/or d) is repeated;
- in a further step f), when the comparison of the parameter representative of the posture of the individual determined in step c) and/or preceding step d) to the corresponding parameter representative of the natural posture determined in step a) shows a difference higher than a second predetermined threshold, then step d) is repeated, and when the comparison of the parameter representative of the posture of the individual determined in step c) and/or preceding step d) to the parameter representative of the natural posture determined in step a) shows a difference comprised between the second predetermined threshold and a third predetermined threshold, the third predetermined threshold being lower than the second predetermined threshold, then the determination of the intersection of the line of sight of the individual with a surface representative of the lens takes into account the difference between the posture of the individual in step c) and/or preceding step d) and the natural posture of step a);

in step b), the visual target is displayed on a display of a displaying device placed in the visual field of the individual, and, in step c), the individual directly adjust the position of the visual target by interacting with said displaying device;

in step c), the individual indirectly adjust the position of the visual target by giving instructions to move the visual target;

in step d), said intersection is determined visually by an operator and manually marked by the operator on the lens worn by the individual;

in a further step h), a verification of the position of the intersection marked on the lens while the individual looks at the visual target in its adjusted position is performed by the operator;

in step d), at least one image of the head of the individual is captured while the individual looks at the visual target in its adjusted position and said intersection is determined by calculations based on this image; and in a further step g), the visual target is displayed in the adjusted position determined in step c), and the individual checks his visual comfort with the visual target in this adjusted position.

The invention also relates to a device for measuring data for fitting an ophthalmic lens in a frame for a given individual, comprising:

a displaying device comprising a display adapted to display a visual target with adjustable position in the field of view of the individual and means controlled by said individual to adjust the position of this visual target on the display, and, a posture monitoring device for determining the posture of the head of the individual.

Advantageously, the device further comprises:

an image capture apparatus, and a computer unit adapted to receive data from the image capture apparatus and the posture monitoring device, and programmed to determine the intersection, with a surface representative of the lens, of the line of sight of the individual looking at the visual target placed by this individual in an adjusted position where it is positioned straight ahead of the individual in a natural posture.

DETAILED DESCRIPTION OF EXAMPLE(S)

The following description, enriched with joint drawings that should be taken as non limitative examples, will help understand the invention and figure out how it can be realized.

The invention provides a method for measuring data for fitting an ophthalmic lens in a frame for an individual.

By "data for fitting an ophthalmic lens in a frame for an individual", it is meant at least a value of a fitting parameter of a lens in frame for an individual.

The fitting parameters are relative to the positioning of the lens relative to the frame chosen by the wearer in order to ensure that the optical features of the lens adequately correct the visual defects of the wearer.

The positioning of the lens depends both on the geometry of the frame and the morphology of the head of the individual.

In order to ensure a correct placement of the lens in front of the eye of the wearer, both the geometrical features of the chosen frame and the morphological features of the individual have to be taken into account.

This is why the fitting parameters are preferably relative to a given frame and a given individual. They are determined on the basis of measurements performed on the individual wearing the chosen frame.

In order to fit a lens in a frame, it is desirable to determine the position of a specific point of the lens relative to the frame, and at least one angle of orientation of the lens relative to the frame about an axis globally perpendicular to a mean plane of the rim of the frame or to a mean plane of the lens when mounted inside the frame.

Figure 4:
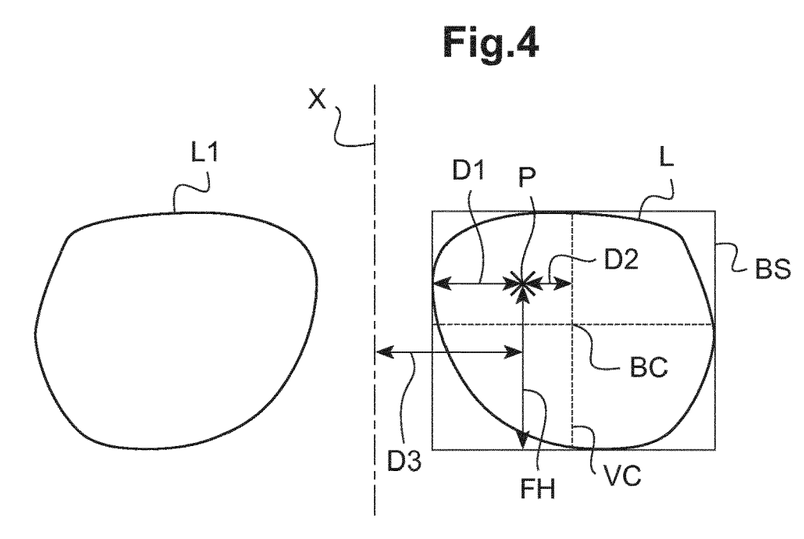
FIG. 4 is a schematic view of a lens with its boxing system and some fitting parameters.

In practice, the specific point of the lens used to fit the lens is for example the fitting point P (FIG. 4).

The fitting point P is a point of the front surface of the lens L stipulated by the manufacturer as a reference point for positioning the lens in front of the eye of the individual. The fitting point position is determined by measuring the vertical and horizontal fitting distances of the fitting point from the boxed center BC of the lens shape (see FIG. 4).

The boxed center BC is defined as the center of the boxing system BS associated with the lens L. As shown on FIG. 4, this boxing system BS is a referential of the lens L, based on the rectangle formed by the horizontal and vertical tangents to the outer most edges of the shape of the lens. The sides of the box are aligned with the horizontal and vertical directions of the lens when placed in a frame on the head of an individual.

The shape of the lens is the outline of the lens in a mean plane of the lens.

In other words, the lens shape is the shape of the edge of the lens projected in a plane when it has been cut to fit inside the frame: the edge of the lens then corresponds precisely to the inner periphery of the circle of the frame, when the frame comprises circles.

When the frame does not comprise circles, the lens shape is that of the lens blank associated to the frame.

FIG. 4 shows the main elements of this boxing system BS for the left lens L whose shape is shown on FIG. 4. Corresponding elements may be defined for the right lens L1.

The standard measurements of fitting parameters use the sides of the boxes as reference lines.

The boxes center BC is the center of the rectangle defined above. The vertical centerline VC is the straight line going through the boxed center and parallel to the side of the rectangle.

The fitting point P position is determined by the fitting point height FH and fitting point horizontal distance to the boxed center D2 or to a vertical side of the box system D1 of the lens L or the horizontal distance D3 to a vertical symmetry axis X of the boxing system BS.

The vertical symmetry axis X of the boxing system BS is defined as the axis of symmetry between the rectangles of the boxing system for the right and left lens when the lens are placed relative to each other as they would be in the chosen frame.

The fitting point height FH is the vertical distance of the fitting point above the horizontal tangent to the lens shape at its lowest point.

The fitting parameters may comprise, among others, the position of the fitting point P, the fitting point height FH, the interpupillary distance and the right and left monocular pupillary distances of the individual.

For an accurate fitting of the lens in the frame for the individual, the fitting point height FH must match the vertical distance between the pupil of the individual and the bottom edge of the lens in the frame when worn, and the distance between the fitting point and the vertical symmetry axis X must match the monocular pupillary distance of the individual.

The pantoscopic angle of the frame relative to the head of the wearer may also be taken into account in order to fit the lens into the frame, for example, in the determination of the position of the fitting cross.

Figure 1:
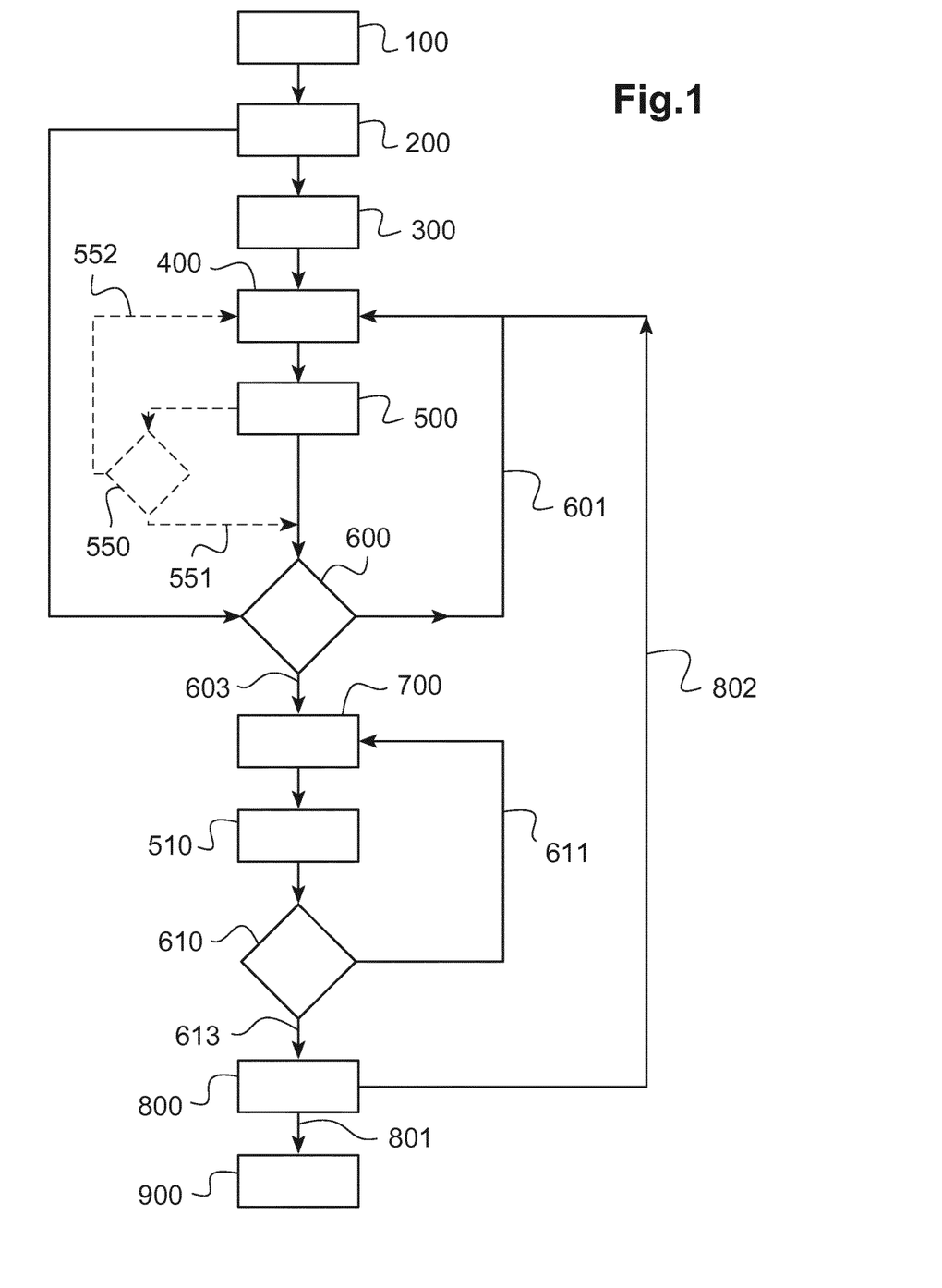
FIG. 1 is a diagram showing schematically the different steps of an embodiment of the method according to the invention.

In a remarkable manner, according to the invention, the method for measuring data for fitting the lens in the frame for the individual comprises the following steps:

a) placing said individual in his natural posture (block 100 of FIG. 1), b) displaying a visual target with adjustable position in the field of view of the individual (block 300 of FIG. 1), c) having the individual equipped with the frame adjust the position of the visual target in order to place it straight ahead from him (block 400 of FIG. 1), d) determining the intersection, with a surface representative of the lens once placed in the frame, of the line of sight of the individual looking at the visual target with its adjusted position and determining said data for fitting the lens in the frame based on the intersection determined (block 700 of FIG. 1).

Thanks to the method according to the invention, it is possible to determine the fitting parameters, or, in other words, the data for fitting the lens in the chosen frame, accurately.

These fitting parameters may indeed be determined based on measurements achieved while the individual is in his natural posture.

The natural posture is assumed by the individual when he looks straight ahead to the horizon without any visual or postural constraint. This natural posture is also called orthostatic posture and corresponds to the position in which the individual achieves minimal efforts. In this natural posture, the Frankfurt plane of the head is horizontal.

The Frankfurt plane is defined as the plane passing through the inferior margin of an orbit (for example, the point called the left orbital) and the upper margin of each ear canal or external auditory meatus, a point called the porion.

Step a)

In step a), the individual is free to position himself without any constraint. He is asked to look straight ahead at a far distance, for example at the horizon, without any specific visual point to look at. Alternatively, the individual is asked to look straight ahead at a shorter distance, for example a few meters away, in the case when the individual is in front of a wall for example. More precisely, at a distance from the individual greater than 2 meters, for example comprised between 2 and 10 meters.

More precisely, in step a), the individual is placed in a natural posture while standing and/or seating and/or walking and/or performing a given tasks. The individual is therefore asked to look straight ahead either at a far distance or a shorter distance, for example between 2 and 10 meters, while standing, and/or seating and/or walking.

In an advantageous variant, the individual is placed in his natural posture in all three situations, successively.

Preferably, during step a), at least a parameter representative of the natural posture of the individual is determined (block 200 of FIG. 1).

To this end, a parameter representative of the posture of the individual is measured while standing and/or seating and/or walking while looking straight ahead without constraint and the corresponding parameter representative of the natural posture of the individual is determined based on this measurement.

In other words, the parameter representative of the natural posture may either be directly measured by measuring a parameter representative of the posture of the individual measured while standing and/or seating and/or walking while looking straight ahead without constraint or it may be deduced, that is, calculated, based on one or several measurements, for example on measurements of a parameter representative of the posture of the individual measured while standing and/or seating and/or walking while looking straight ahead without constraint.

In the first case, the parameter representative of the natural posture is identified to the parameter representative of the posture of the individual measured while standing and/or seating and/or walking while looking straight ahead without constraint. In the second case, the parameter representative of the natural posture is calculated based on the parameter representative of the posture of the individual measured while standing and/or seating and/or walking while looking straight ahead without constraint.

Figure 3:
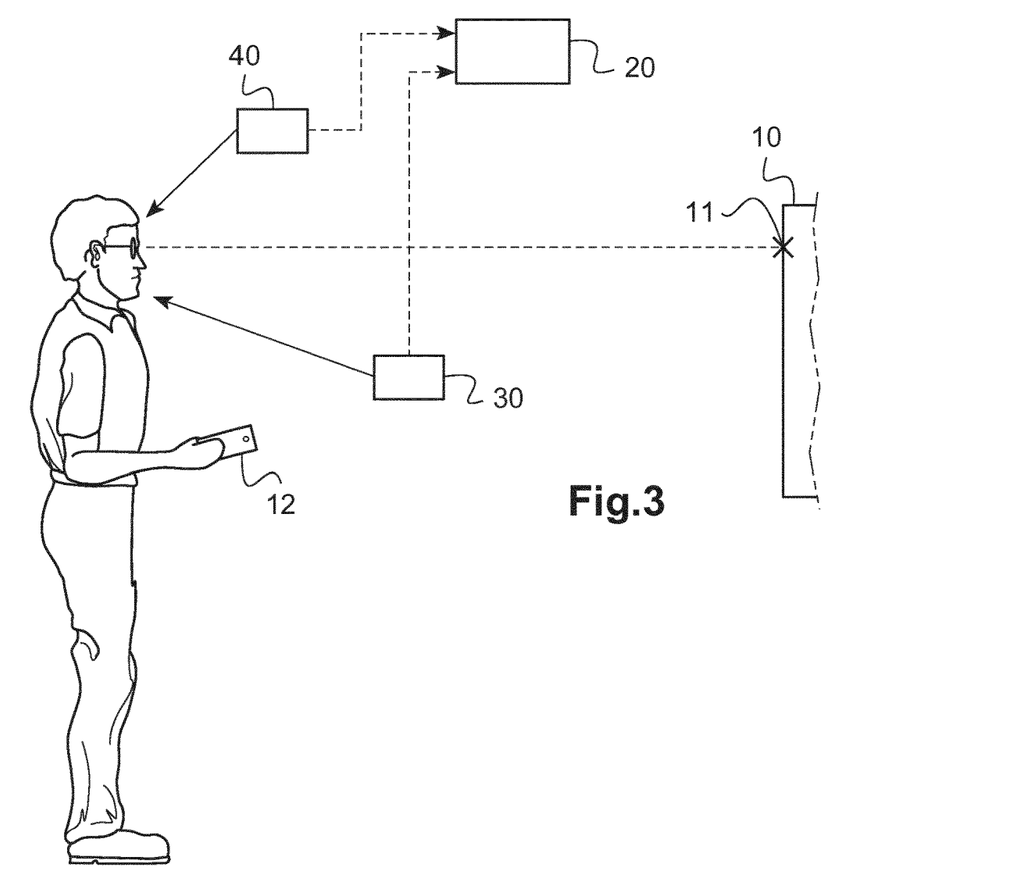
FIG. 3 is a schematic view of a device according to the invention.

A posture monitoring device 40 may be used (FIG. 3).

The posture of the individual is here the posture of his head. It is for example determined by measuring at least one angle of rotation of the head about an axis of a known referential. Preferably, the angles of rotation of the head of the individual about at least two or three axes of this known referential are determined.

Different methods for determining a parameter representative of the posture of the individual are known from the man skilled in the art. These methods use for example one or several images of the head of the individual captured by an image capture apparatus, and determine at least one angle of rotation of the head about an axis of a referential linked to the image capture apparatus. Preferably, the angle of rotation of the head of the individual is determined about at least two or three axes of the referential linked to the image capture apparatus, for a more complete determination of the posture of the head of the individual.

For example, it is known to determine the parameter representative of the posture of the individual based on an image capture of the head of the individual wearing a posture control clip. Such a posture control clip carries known patterns allowing to determine the posture of the head in three dimensions.

Another possibility is to use a posture monitoring device that comprises a sensor with a gyroscope and/or an accelerometer and/or a magnetometer.

The parameter representative of the natural posture may comprise the one or several of the angles of rotation of the head of the individual measured, or may be deduced from the angles of rotation of the head in natural posture determined in different situations.

In particular, a global parameter representative of the natural posture of the individual may take into account the parameters determined for the individual in different situations, for example while standing, seating, and/or walking. It is then deduced from different parameters representative of the natural postures measured.

The global parameter representative of the natural posture of the individual may for example be an average value of the parameters representative of the natural postures determined in the different situations. This average value may be a pondered average value taking into account the different importance of the situations for the individual.

For example, for an elderly people spending most of his time seated, the parameter representative of the natural posture determined while seating will have a greater ponderation factor than the parameters determined in other situations.

During step a), the individual may wear the chosen frame or not, with or without lenses, or he may wear a previous ophthalmic equipment.

Step b)

In step b), the visual target is displayed in the field of view of the individual (block 300 of FIG. 1).

This visual target 11 is displayed on a display 10 of a displaying device placed in the visual field of the individual (FIG. 3).

This visual target 11 is for example a luminous target displayed on a screen, placed in front of the individual. It may be projected on the screen in case of a passive screen or resulting from illumination of some of the pixels of the screen in the case of an active screen, for example an LCD screen.

Alternatively, it may also be a non-luminous target, for example corresponding to non illuminated pixels on an otherwise illuminated screen. The visual target can for example be projected on a wall or displayed on a computer screen, TV or more generally an LCD screen.

The visual target may have any shape or color easily distinguished by the individual.

Its position on the screen may be adjusted, either by modifying the position of the source or the position of an optical element placed on the light pathway in the case where the visual target is projected on the screen or by modifying the position of the lighted pixels in case of an active screen.

Step c)

In step c), the individual is asked to adjust the position of the visual target in order to place it straight ahead from him (block 400 of FIG. 1).

The individual is here equipped with the frame chosen for his ophthalmic equipment.

In order to perform this position adjustment of the visual target, the individual may have a remote control 12 (FIG. 3) allowing him to move the visual target displayed on the screen or the light source or optical element used to project this visual target.

The individual may directly adjust the position of the visual target by interacting by himself with said displaying device, or indirectly adjust the position of the visual target by giving instructions to move the visual target, for example by providing oral instructions to another person who performs the adjustment of the position of the visual target.

In practice, the adjustment can be done with a joystick by the individual or with instructions given by the individual to the operator, for example by choosing between 2 positions, and iterating until the good position is found.

The adjustment may also be performed by providing oral instruction to a speech recognition system.

The individual places the visual target at an adjusted position of his choice, straight ahead from him according to his own perception.

Step d)

In step d) (block 700 of FIG. 1), the intersection, with a surface representative of the lens once placed in the frame, of the line of sight of the individual looking at the visual target with its adjusted position is determined.

The line of sight of the individual is defined as the straight line between the pupil of the individual and the visual target.

In a first embodiment of this step d), the individual wears the chosen frame with a lens and said intersection is determined visually by an operator and manually marked by the operator on the lens worn by the individual. This corresponds to a manual determination of the intersection.

The surface relative to the lens once placed in the frame is then a front surface of the lens oriented towards the operator.

The individual looks at the visual target in its adjusted position. He is asked to keep his eyes and his head still.

The operator looks straight ahead at the individual, in front of him, and marks the position of the pupil of the individual on the front surface of the lens oriented toward him, for example with a marker.

The position of the intersection looked for is then physically determined on the lens.

The data for fitting the lens in the frame corresponds for example to the position of this point of intersection, which is identified to the position of the fitting point previously defined.

Preferably, in this embodiment of the method, in a further step of verification, step h), after marking the lens in step d), the operator verifies the position of the intersection marked on the lens while the individual looks at the visual target in its adjusted position. The posture of the individual may be monitored during this step h) and compared to the natural posture determined in step a). If the posture of the individual determined in step h) is too far from the natural posture determined in step a), that is to say, if the difference between the parameters representative of the posture determined in both situation exceeds a given threshold, it is possible to give a visual or sound feedback to the individual indicating to him that he should adjust his posture, and optionally how he should move to adjust his posture in order to get closer to the natural posture.

For example, the target or background could be displayed with a different color if the posture of the individual determined in step h) is too far from the natural posture determined in step a), In another embodiment of step d), at least one image of the head of the individual is captured by an image capture apparatus 30 (FIG. 3) while the individual looks at the visual target in its adjusted position and said intersection is determined by a computer unit, with calculations based on this image.

This image may be a front face image of the individual or a profil image.

Preferentially, the image capture apparatus optical axis is aligned with the line of sight of the individual.

The calculations may be based on a plurality of these images.

In this case, the individual wears the frame not necessarily equipped with a lens during step d).

The surface representative of the lens once placed in the frame is then determined through calculation, on the basis of the shape of the rim of the frame. As mentioned before, this surface may be a front or back face of the lens, a mean plane of the lens, a mean surface of the lens, that is to say a surface equidistant from said front and back face. It may also be a surface determined based on the frame that will receive the lens, for example a mean plane or surface of the rim that receives the lens, or any other surface representative of the location of the rim of the frame.

It may be for example a plane of the lens shape as defined in norm ISO 8624:2011, as the plane tangential to the front surface of a plano or demonstration or dummy lens at its boxed centre BC, when mounted in the frame.

A demonstration lens or dummy lens is the plano lens mounted in the frame by the manufacturer for display purposes.

It may also be a plane of the spectacle front, defined in norm ISO 8624:2011 as the plane containing the vertical centerlines VC of the right and left boxed lens shapes (see FIG. 3 for the left boxed lens shape). These centerlines go through the boxed center BC and are parallel to the vertical sides of the rectangle framing the outside periphery of the lens, which is equivalent to the inside periphery of the frame, in the box system.

This may be an approximation if the two centrelines VC are not parallel to each other.

The surface representative of the lens once placed in the frame may be approximated to the image capture plane. This is especially the case when the pantoscopic angle is inferior to a threshold angle value.

Said data is then determined based on the position of this point of intersection relative to the frame.

For example, the fitting point P is identified to the point of intersection determined, or its projection in another plane. The fitting height FH and the horizontal distances D1, D2, D3 between the fitting point P and vertical side of the boxing system, the boxed center or symmetry axis X may also be deduced base on the position of the intersection determined. The position of the intersection is indeed determined relative to the outside periphery of the lens.

In practice, the image of the center of the pupil of the individual is identified on the image captured and the point of intersection is identified to this center of the pupil. The image of the outside periphery if the lens to be mounted in the frame may also be identified on the image captured. The boxing system of the lens to be placed inside the frame may then be deduced from the image.

According to yet a preferred embodiment, in step c) and/or d), the posture of the individual looking at the visual target is determined and compared to the natural posture determined in step a). To this end, the parameter representative of the posture of the individual in step c) and/or d) is determined and compared to the corresponding parameter representative of the natural posture determined in step a). The corresponding parameters may be compared.

Preferably, the posture of the head of the individual is monitored at least during one of steps c) (block 500 of FIG. 1) and/or d) (block 510 of FIG. 1). This is done by a posture monitoring device 40 (FIG. 3).

More precisely, the posture of the individual is preferably measured in step c) and/or d), with the same technique as used in step a) to determine the posture of the individual.

For example, the same image capture apparatus or a different image capture apparatus may be used to capture at least one image of the head of the individual. The orientation of the head about the axes of the referential linked to the image capture apparatus used in step a) is then determined.

Alternatively, it may be measured with a different technique.

No matter what technics are used in step a) and c) and/or d) to measure the posture of the individual, the parameters representative of the postures determined in step a) and step c) and/or d) are considered in a common referential in order to be compared together.

The difference between the parameter representative of the natural posture determined in step a), and the parameter representative of the posture determined in step c) and/or d) is compared to a threshold (blocks 600 and 610 of FIG. 1 respectively).

For example, the angles of rotation of the head of the wearer about each axis considered are compared together.

The difference in posture may for example be determined by comparing the corresponding angle of rotation determined.

The difference between these angles is calculated and preferably compared to an angle threshold value.

In the case described above, the difference between the postures determined is quantified by the difference in the angle of rotation of the head of the individual about at least one axis, preferably about at least two or three axes.

This difference may then be compared to an angle threshold, for example comprised between 1 and 5 degrees.

For example, as shown on FIG. 1, the posture of the individual is determined in step c) (block 500) and compared (block 600 of FIG. 1) to the natural posture determined in step a) (block 200).

Then, when the comparison of the posture of the individual determined in step c) to the natural posture determined in step a) shows a difference in posture lower than a first predetermined threshold equal for example to a value between 1.5 and 4 degrees, the determination of the intersection of the line of sight with a plane representative of the lens is performed (block 700 of FIG. 1) and validated as accurate (path 603 of FIG. 1).

Alternatively, when the comparison of the parameter representative of the posture of the individual determined in step c) to the parameter representative of the natural posture determined in step a) shows a difference higher than a predetermined threshold, the posture of the individual is corrected, in a further step e), in order to reduce this difference and step c) is repeated.

In practice, if the posture of the individual determined in step c) is too far from the natural posture determined in step a), the individual is asked to repeat the adjustment of the position of the visual target and the determination of the intersection of the line of sight with a plane representative of the lens is performed after this repeated step c) (path 601 of FIG. 1).

If the posture of the individual determined in step c) is too far from the natural posture determined in step a), it is also possible to give a visual or sound feedback to the individual indicating to him that he should adjust his posture, and optionally how he should move to adjust his posture in order to get closer to the natural posture.

For example, the target or background could be displayed with a different color if the posture of the individual determined in step c) is too far from the natural posture determined in step a).

If the posture of the individual determined in step c) is close enough to the natural posture determined in step a) then the intersection with a surface representative of the lens is determined in step d) (path 603, block 700 of FIG. 1).

The posture of the individual may also be determined in step d) (block 510) and compared (block 610 of FIG. 1) to the natural posture determined in step a) (block 200).

The same first predetermined threshold as for step c) may be used to validate the difference in posture of the individual determined in step d) to the natural posture determined in step a).

When the comparison of the posture of the individual determined in step d) to the natural posture determined in step a) shows a difference in posture lower than the first predetermined threshold, then the determination of the intersection of the line of sight with a plane representative of the lens is validated as accurate (path 613 of FIG. 1).

When the comparison of the posture of the individual determined in step d) to the natural posture determined in step a) shows a difference in posture higher than the first predetermined threshold, then the individual is asked to adjust his posture and step d) is repeated (path 611 of FIG. 1).

Figure 2:
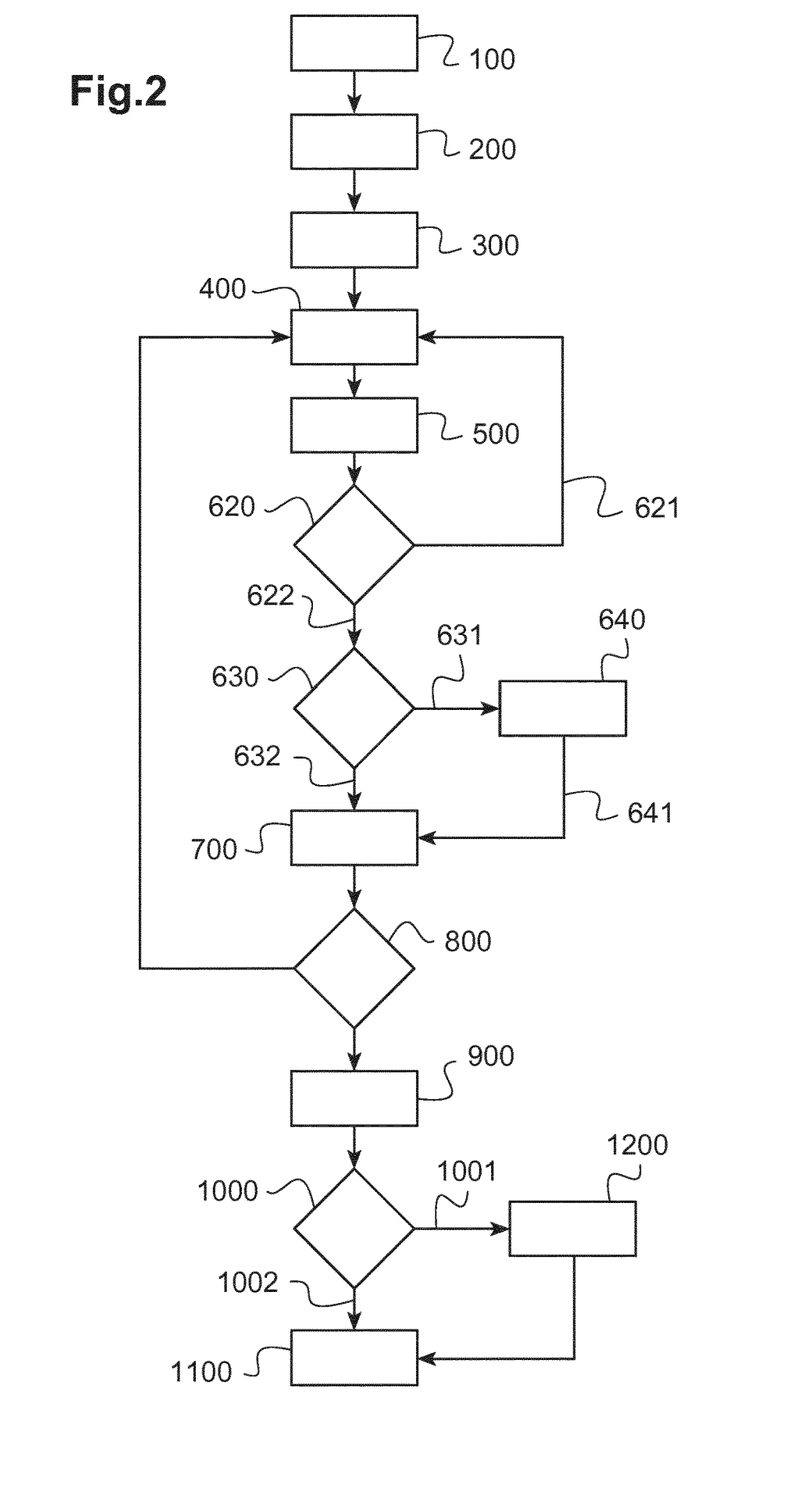
FIG. 2 is a diagram showing schematically the different steps of a variant of the method according to the invention.

In a variant, in a further step f), when the comparison (block 620 of FIG. 2) of the parameter representative of the posture of the individual determined in step c) and/or preceding d) to the parameter representative of the natural posture determined in step a) shows a difference higher than a second predetermined threshold, then step d) is repeated (path 621 of FIG. 2). The second predetermined threshold is for example equal to 5 degrees.

Otherwise, the method proceeds (path 622 of FIG. 2) to another comparison (block 630 of FIG. 2).

If the difference between the parameter representative of the posture of the individual determined in step c) and/or preceding d) to the parameter representative of the natural posture determined in step a) shows a difference comprised between the second predetermined threshold and a third predetermined threshold, then the method proceeds (path 631 of FIG. 2) to a step of memorization (block 640 of FIG. 2). The third predetermined threshold is lower that the second predetermined threshold. The third predetermined threshold is for example equal to 3 degrees.

During the step of memorization, a value representative of the difference between the posture of the individual determined in step c) and/or preceding d) and the natural posture determined in step a) is memorized.

The method then proceeds to step d) (path 641 of FIG. 2).

In the case where the difference between the parameter representative of the posture of the individual determined in step c) and/or preceding d) to the parameter representative of the natural posture determined in step a) shows a difference lower than the third threshold, then the method directly proceeds to step d) (path 632 of FIG. 2) without implementing the memorization step.

In a step of correction retrieval (block 1000 of FIG. 2), the method checks whether a value representative of the difference between the posture of the individual determined in step c) and/or preceding d) and the natural posture determined in step a) is memorized.

If a value representative of the difference between both postures was memorized (path 1001 of FIG. 2), then the determination of the intersection of the line of sight of the individual with a surface representative of the lens takes into account the difference between the posture of the individual determined in step c) and/or preceding d) and the natural posture determined in step a) In practice, in a step of calculation (block 1100 of FIG. 2), the calculations used to determine the position of the intersection are modified in a step of correction (block 1200 of FIG. 2) to take into account and correct the position of the intersection calculated in order to obtain the position of the intersection that would be calculated if the individual was in natural posture.

If no value representative of the difference between both postures was memorized, the position of the intersection is calculated in the step of calculation with the value of the parameter representative of the posture of the individual determined in step c) and/or preceding d) (path 1002 and block 1100 of FIG. 2).

It is also possible to combine steps e) and f). For example the comparison (block 610) of the parameter representative of the posture of the individual determined in step d) to the parameter representative of the natural posture determined in step a) can be carried out after step d).

As a variant, the posture of the individual may be continuously monitored during step c) and/or d). In this case, the operator may monitor the posture and indicate to the individual to correct his posture while he is adjusting the position of the visual target in step c). He may also only mark the position of the intersection looked for on the lens when the posture of the individual is sufficiently close to the natural posture in the first embodiment of step d) previously described. He may alternatively trigger the capture of an image and the calculation of the position of the intersection only when the posture of the individual is sufficiently close to the natural posture in the second embodiment of step d) previously described.

In this case, images of the individual are captured continuously or at time intervals, and the computer unit determines the parameter representative of the posture continuously or at time intervals, and perform the comparison described before. When the posture of the individual is determined to be too far from the natural posture, the operator is informed. An alert signal is for example emitted. Preferably, in a further step g), the visual target is displayed in the adjusted position determined in step c), and the individual is asked to check his visual comfort with the visual target in this adjusted position (block 800 of FIG. 1).

The individual either validates the adjusted position of the visual target when his visual comfort is satisfactory (path 801 of FIG. 1), or rejects the adjusted position when his visual comfort is insufficient (path 802 of FIG. 1), step c) and step d) being then repeated.

In the case where the individual validates the adjusted position of the visual target as comfortable, the data for fitting the lens determined based on the position of the intersection determined in step d) is validated (block 900 of FIG. 1).

It is also possible to perform similar a checking step during step c), after adjustment of the position of the visual target (block 400 of FIG. 1) or after determination of the posture of the individual in step c) (block 500 of FIG. 1). This last case is represented on FIG. 1 by block 550.

To this end, the visual target is displayed in the adjusted position determined, and the individual is asked to check his visual comfort with the visual target in this adjusted position (block 550 of FIG. 1).

The individual either validates the adjusted position of the visual target when his visual comfort is satisfactory (path 551 of FIG. 1), or rejects the adjusted position when his visual comfort is insufficient (path 552 of FIG. 1), step c) being then repeated.

In a variant, steps a), b) and c) may be repeated for different situations of the individual (standing, seating, walking), and the data for fitting the lens inside the frame determined in step d) may take into account the position of the intersection of the line of sight of the individual with the plane representative of the lens determined for these different situations.

The invention also related to a device for implementing the method according to the invention as described before.

The device according to the invention is a device for measuring data for fitting an ophthalmic lens in a frame for a given individual, comprising:
- a displaying device comprising a display 10 adapted to display a visual target 11 with adjustable position in the field of view of the individual, and means 12 for the individual to adjust the position of this visual target on the display, and,
- a posture monitoring device 40 for determining the posture of the individual.

The displaying device was described before.

The means to adjust the position of the visual target allows the individual whose fitting parameters are to be determined to adjust the position of the visual target according to his own perception.

The posture monitoring device may be any of those already known from the man skilled in the art.

It may be used by itself when the method is based on a manual measurement performed by the operator, as already described.

Preferably, the device also comprises, in association with the posture monitoring device:
- the image capture apparatus 30, and
- the computer unit 20, which is adapted to receive data from the image capture apparatus 30 and programmed to determine the intersection, with a surface representative of the lens, of the line of sight of the individual looking at the visual target placed by this individual in an adjusted position where it is positioned straight ahead of the individual in a natural posture.

The computer unit 20 preferably also receives information from the posture monitoring device 40. It is programmed to perform the comparison step described before and inform the operator when the posture of the individual is far from the natural posture, that is to say when the difference between these two postures is higher than a predetermined threshold.

This device may be dedicated to implementation of the method according to the invention or integrated to an existing device, as described below.

Based on these general features of the method according to the invention, the invention notably comprises the following specific embodiments of the method.

First "Manual" Embodiment

The individual is asked to stand up in the natural posture. He adjusts the position of the visual target. The operator, for example the optician, marks the lens. Then the individual seats down and is placed in the natural posture. The individual adjusts the position of the visual target. The operator marks the lenses in this other situation.

Finally, the operator verifies the position of the markings, while the individual looks at the visual target in its adjusted position, and the operator defines, depending on the two marks and the step of verification, the coordinates of the Fitting point.

Second "Manual" Embodiment

The operator monitors the posture of the individual. In this case, the individual, wearing for example a posture control clip, stands up and is placed in natural posture. While the posture is monitored, the individual adjusts the position of the visual target in step c) and the operator marks the point of intersection on the lens. The operator then ensures that the individual's posture remains close to the natural posture while adjusting the position of the visual target and/or while the point of intersection is determined.

Then, the wearer seats down in natural posture. While the operator monitors the posture of the individual, the individual adjusts the position of the visual target in step c).

The operator marks the intersection looked for on the lens in step d).

The operator verifies the position of the markings, while the individual looks at the visual target in the adjusted position, and the operator defines, depending on the two marks and the step of verification, the coordinates of the Fitting point.

Embodiment Using Visoffice®

The method according to the invention may also be implemented by existing devices already used by the opticians, such as the Visioff ice device. In that case, the individual stands up perpendicular to the Visioff ice and is placed in natural posture.

While the operator monitors the posture of the individual, the individual adjusts the position of the visual target.

The Visioffice device calculates the data for fitting.

Embodiment Using M'Eye Fit® Device

Adjustment of the position of the adjustable visual target and, optionally, the monitoring of the individual's posture as described before, to ensure that the individual remains in a posture close to the natural posture may also be implemented by the M'eye Fit device.

In that case, the individual is seated and placed in the natural posture in step a). The wearer adjusts the position of the visual target in step c). The rest of the measurement protocol of the M'Eye Fit device is unchanged.

Alternatively, the individual is seated, wearing the posture control clip, in and placed in a natural posture. While monitoring the posture, the individual adjusts the position of the visual target and the device calculates the data for fitting the lens, for example the fitting height, knowing the adjusted position of the visual target.

The method according to the invention provides a visual task (staring at the visual target) and a non-visual task (moving the visual target in front of him) to the individual whose fitting data needs to be assessed. Thanks to these tasks, the individual is more likely to remain in a natural posture during determination of the intersection of the line of sight and a plane representative of the lens to be worn by the individual. The fitting data may then be determined more precisely, which will lead to provide a ophthalmic equipment better adapted to the individual.

The invention claimed is:

1. A method for measuring data for fitting an ophthalmic lens in a frame for an individual, comprising the following steps:
   a) placing the individual in a natural posture assumed by the individual when the individual looks straight ahead to the horizon without any visual or postural constraint;
   b) displaying a visual target with an adjustable position in a field of view of the individual;
   c) having the individual equipped with the frame adjust the position of the visual target in order to place the visual target straight ahead from the individual; and
   d) determining an intersection, with a surface representative of the lens once placed in the frame, of a line of sight of the individual looking at the visual target with the adjusted position, and determining said data for fitting an ophthalmic lens in a frame based on the intersection determined,
   wherein, in step a), a parameter representative of the natural posture of the individual is determined, said parameter representative of the natural posture comprising one or more angles of rotation of the head of the individual measured, or being deduced from the angles of rotation of the head in the natural posture determined in different situations, and
   wherein, in step c) and/or d), a parameter representative of the posture of the individual looking at the visual target is determined and compared to the corresponding parameter representative of the natural posture determined in step a).

2. The method according to claim 1, wherein, in step a), the individual is placed in the natural posture while standing and/or seating and/or walking.

3. The method according to claim 2, wherein, in step b), the visual target is displayed on a display of a displaying device placed in the visual field of the individual, and, in step c), the individual directly adjusts the position of the visual target by interacting with said displaying device.

4. The method according to claim 1, wherein, in step a), the parameter representative of the posture of the individual is measured while standing and/or seating and/or walking while looking straight ahead without constraint and said parameter representative of the natural posture is determined based on said measurement.

5. The method according to claim 4, wherein, in step c) and/or d), a parameter representative of the posture of the individual looking at the visual target is determined and compared to the corresponding parameter representative of the natural posture determined in step a).

6. The method according to claim 1, wherein, in a further step e), when the comparison of the parameter representative of the posture of the individual determined in step c) and/or d) to the parameter representative of the natural posture determined in step a) shows a difference higher than a first predetermined threshold, the posture of the individual is corrected in order to reduce said difference and step c) and/or d) is repeated.

7. The method according to claim 6, wherein, in a further step f), when the comparison of the parameter representative of the posture of the individual determined in step c) and/or preceding d) to the parameter representative of the natural posture determined in step a) shows a difference higher than a second predetermined threshold, then step d) is repeated, when the comparison of the parameter representative of the posture of the individual determined in step c) and/or preceding d) to the parameter representative of the natural posture determined in step a) shows a difference comprised between the second predetermined threshold and a third predetermined threshold, the third predetermined threshold being lower than the second predetermined threshold, then the determination of the intersection of the line of sight of the individual with a surface representative of the lens takes into account the difference between the posture of the individual in step c) and/or preceding d) and the natural posture of step a).

8. The method according to claim 1, wherein, in a further step f), when the comparison of the parameter representative of the posture of the individual determined in step c) and/or preceding d) to the parameter representative of the natural posture determined in step a) shows a difference higher than a second predetermined threshold, then step d) is repeated, when the comparison of the parameter representative of the posture of the individual determined in step c) and/or preceding d) to the parameter representative of the natural posture determined in step a) shows a difference comprised between the second predetermined threshold and a third predetermined threshold, the third predetermined threshold being lower than the second predetermined threshold, then the determination of the intersection of the line of sight of the individual with a surface representative of the lens takes into account the difference between the posture of the individual in step c) and/or preceding d) and the natural posture of step a).

9. The method according to claim 1, wherein, in step b), the visual target is displayed on a display of a displaying device placed in the visual field of the individual, and, in step c), the individual directly adjusts the position of the visual target by interacting with said displaying device.

10. The method according to claim 1, wherein, in step c), the individual indirectly adjusts the position of the visual target by giving instructions to move the visual target.

11. The method according to claim 1, wherein, in step d), said intersection is determined visually by an operator and manually marked by the operator on the lens worn by the individual.

12. The method according to claim 1, wherein, in a further step h), a verification of the position of the intersection marked on the lens, while the individual looks at the visual target in the adjusted position, is performed by the operator.

13. The method according to claim 1, wherein, in step d), at least one image of the head of the individual is captured while the individual looks at the visual target in the adjusted position, and said intersection is determined by calculations based on said image.

14. The method according to claim 1, wherein, in a further step g), the visual target is displayed in the adjusted position determined in step c), and the individual checks a visual comfort of the individual with the visual target in the adjusted position.

15. A device for measuring data for fitting an ophthalmic lens in a frame for an individual, comprising:
   a displaying device comprising a display adapted to display a visual target in a field of view of the individual, with an adjustable position and means controlled by the individual to adjust the position of said visual target on the display; and
   a posture monitoring device that determines a posture of the head of the individual by
      determining a parameter representative of a natural posture of the individual, said parameter representative of the natural posture comprising one or more angles of rotation of the head of the individual measured, or being deduced from the angles of rotation of the head in the natural posture determined in different situations, and determining a parameter representative of the posture of the individual looking at the visual target and comparing said parameter to the corresponding parameter representative of the natural posture.

16. The device according to claim 15, further comprising:

an image capture apparatus; and a computer unit adapted to receive data from the image capture apparatus and the posture monitoring device, and programmed to determine an intersection, with a surface representative of the lens, of the line of sight of the individual looking at the visual target placed by the individual in an adjusted position where the visual target is positioned straight ahead of the individual in a natural posture.

\* \* \* \* \*